March 17, 1931.  G. B. INGERSOLL  1,797,198
FILTER
Filed April 5, 1928
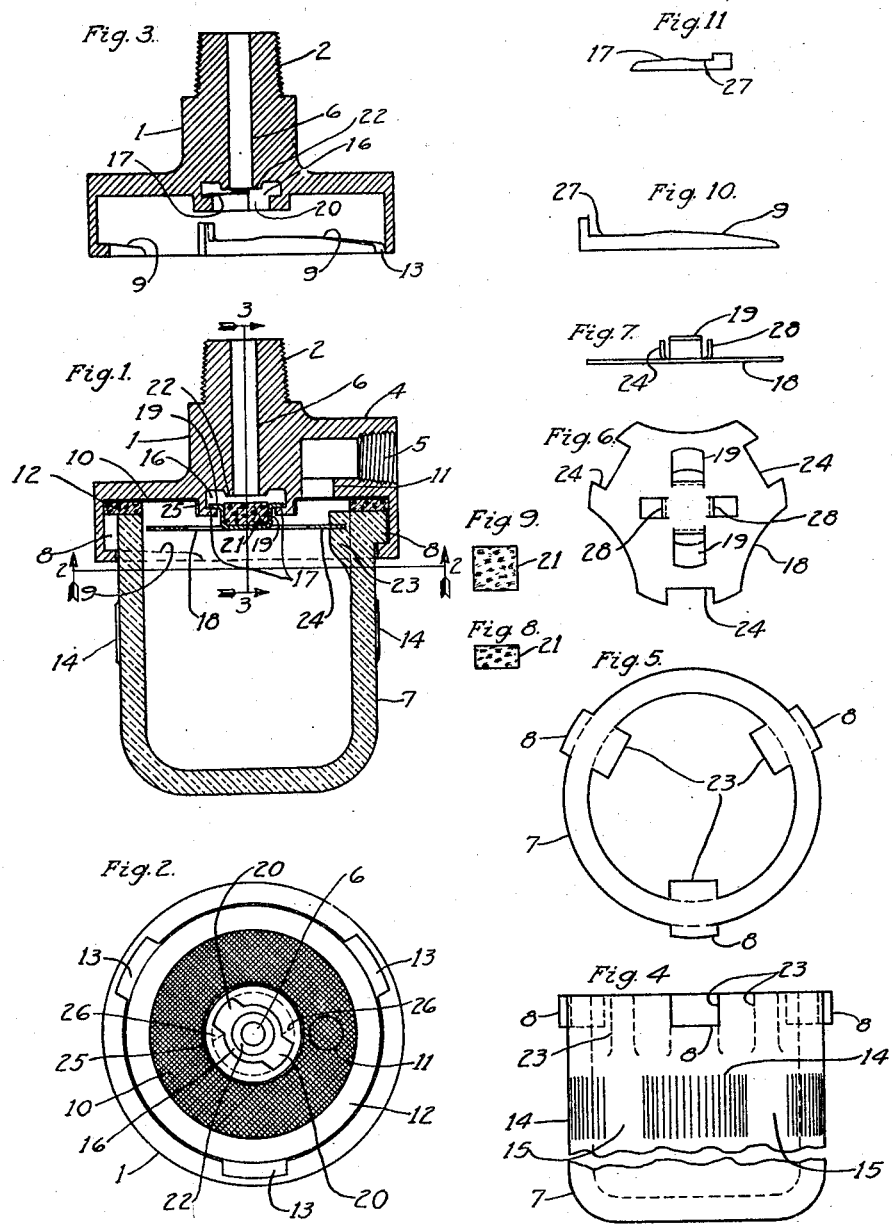

Patented Mar. 17, 1931

1,797,198

UNITED STATES PATENT OFFICE

GEORGE B. INGERSOLL, OF DEARBORN, MICHIGAN

FILTER

Application filed April 5, 1928. Serial No. 267,746.

My invention relates to improvements in gasoline filters as generally used in conjunction with internal combustion engines; and the objects of my improvement are, first, to provide a filter and shut off comprising a lesser number of parts than generally used heretofore thus permitting of manufacture and sale at a very low cost; second, to provide a filter with an automatic valve; third, to provide a filter having a quickly attached or detached sediment receptacle; fourth, to provide a filter with a self locking sediment receptacle without threads; fifth, to provide a filter with an automatic shut off valve having no threaded parts; sixth, to provide a filter that may be furnished with or without a shut off valve without changing the design of any of the individual parts; and seventh, to provide a filter having a removable receptacle with hand holds.

I attain these objects by the mechanism illustrated in the accompanying drawing, in which—

Figure 1 is a vertical section of the entire filter; Fig. 2, a horizontal section of the filter on the line 2—2, Fig. 1, without the sediment bowl and shut off valve; Fig. 3, a vertical section of the filter body on the line 3—3, Fig. 1; Fig. 4, a side view of the sediment receptacle; Fig. 5, a plan view of the sediment receptacle; Fig. 6, a plan view of the shut off valve plate; Fig. 7, a side view of the shut off valve plate; Fig. 8, an end view of the valve gasket; Fig. 9, a plan view of the valve gasket; Fig. 10, a developed view of one of the cams on the head; and Fig. 11, a developed view of one of the cams on the head.

Similar numerals refer to similar parts throughout the several views.

The filter body 1 is provided with a threaded extension 2 for attaching to a suitable supporting unit, such as a vacuum tank, and a boss 4 having a tapped hole 5 for attachment with a gasoline line connection. The filter head 1 is provided with the hole 6 through which the gasoline may flow into the glass receptacle 7. The receptacle 7 is provided with extensions 8 which engage cam surfaces 9 on the inside of the lower portion of the filter head 1. A filtering screen 10 fits within the filter head 1 and covers the hole 11 in the filter body 1, the hole 11 forming the exit passage for the gasoline as it flows from the receptacle 7 through the filter screen 10 and out through the tapped hole 5. A gasket 12 also fits within the filter head 1 adjacent the filtering screen 10. The filter head 1 is further provided with recesses 13 through which the extensions 8 may pass. As the receptacle is revolved, the extensions 8 engage the cam surfaces 9 and force the receptacle 7 upwardly, thus compressing the screen 10 and the gasket 12 toward the filter head 1, the gasket 12 forming a tight joint between the filter head 1 and the top of the receptacle 7. One of the cam surfaces 9 is shown in a developed position in Fig. 10. The receptacle 7 is provided with portions 14 forming handholds to prevent the operator's hand from slipping thereon. These handholds may be, if desired, raised, sunken, or knurled portions on the outside wall of the bowl 7. Spaces 15 may be left between the portions 14 to permit the sediment in the receptacle 7 to be readily observed, if glass is used or to better provide for hand holds. The filter head 1 is further provided with a chamber 16 having cam surfaces 17, one of which is shown in a developed position in Fig. 11. It is to be noted that the cam surfaces 17 have their angle of inclination disposed oppositely from the angle of the cam surfaces 9. The shut off valve plate 18 is provided with extensions or fingers 19 which are adapted to engage the cam surfaces 17. The filter head 1 is also provided with recesses 20 through which the extensions 19 may pass. As the shut off plate 18 is turned, the extensions 19 engage the cam surfaces 17 and force the shut off valve plate 18 upwardly thus compressing the gasket 21 against the surface 22 of the filter head 1, thus completely covering the hole 6 and shutting off the flow of the gasoline therefrom. The shut off valve plate 18 is operated by means of the extensions 23 on the receptacle 7 engaging the slots 24 of the shut off valve plate 18. The shut off valve plate 18 is also provided with lugs 28 for retaining the gasket 21 in place. When it becomes necessary to remove the receptacle 7, it is grasped firmly by the portions 14 and revolved. This causes the extensions 8 to travel down the cam surfaces 9 which gradually removes the compression from the gasket 12. During this operation the shut off valve plate 18 is being revolved and this causes the extensions 19 to travel up the cam surfaces 17 on the filter head 1, thus gradually compressing the gasket 21 against the surface 22. It is to be noted that the cam surfaces 9 and 17 will be located with respect to each other so that the shut off valve plate 18 will bring the gasket 21 up to the surface 22 in the first few degrees of rotation for removing the receptacle 7. As the receptacle 7 is further revolved to allow the extensions 8 to be removed through the recesses 13 the gasket 21 will be compressed sufficiently to completely shut off the flow of gasoline in the hole 6. When the receptacle 7 is replaced in the strainer head, the extensions 8 are passed through the recesses 13 and simultaneously the extensions 23 on the inside of the receptacle 7 are placed in engagement with the notches 24 in the shut off valve plate 18. Then as the receptacle 7 is revolved to cause the extensions 8 to travel up the cam surfaces 9, the shut off valve plate is revolved in the same direction, thus causing the extensions 19 to travel down the cam surfaces 17, thus restoring the flow of gasoline through the hole 6 by releasing the compression on the gasket 21. The gasket 21 may be made of sufficient resiliency to allow for any necessary amount of partial rotation of the receptacle 7 after the gasket 21 first touches the surface 22. Thus the cam surface 9 may be developed so that the gasket 21 will contact with the surface 22 very quickly as the receptacle 7 is started to revolve out of the strainer head 1, the balance of the rotation resulting in a steady compression of the gasket 21. This process would be reversed when the receptacle 7 is replaced in the filter head 1, thus delaying the removal of compression on the gasket 21 until the receptacle 7 has established a tight joint by compressing the gasket 12.

It is to be noted that the filtering screen 10 has a flange 25 which presses over the outside walls of the recess 16. The gasket 12 may be suitably attached to the filtering screen 10. This allows the diameters of these two parts to be of such size as will permit of easy assembling through the mouth of the filter head 1. The filter head 1 may be cast with small lugs 26 for preventing the shut off valve plate 18 from falling or working out through the openings 20 when the receptacle 7 is removed from the filter head 1.

The cam surfaces 9 and 17 may be provided with a dwell portion 27 for maintaining the bowl 7 and the shut off plate 18 in a locked position.

It is to be understood that the receptacle 7 and the filter head 1 may be utilized as a filter without the shut off plate 18 where a more economical unit is desired.

I claim:

1. In a filter, the combination of a body having inlet and outlet passages, said body being provided with an annular recess adjacent said inlet passage, said body being further provided with a larger annular recess surrounding the annular recess adjacent said inlet passage, means for opening and closing the inlet passage of said body, said means being supported within the annular recess adjacent said inlet passage of said body, said means extending within said larger recess of said body, a removable receptacle supported within said larger annular recess of said body and engaging said means for opening and closing the inlet passage of said body, said removable receptacle being capable of being rotated through less than one revolution only, said removable receptacle thereby operating said means for opening and closing said inlet passage of said body, a strainer member mounted between said body and said removable receptacle, and means for maintaining a tight joint between said body and said removable receptacle.

2. In a filter, the combination of a body having an inlet and outlet passage, said body being provided with an inner annular recess surrounding the inner end of said inlet passage of said body, said inner annular recess having a plurality of flanges with spaces therebetween, each of said flanges being provided with an integral cam surface on its inner side, said body being further provided with an outer annular recess surrounding said inner annular recess of said body, said outer annular recess having a plurality of flanges with spaces therebetween, each of said flanges of said outer annular recess of said body being further provided, on its inner side, with an integral cam surface oppositely disposed to said cam surface on said flanges of said inner recess of said body, a valve member for opening and closing said inlet passage of said body, said member having arms adapted to pass through said spaces between and engage said integral cam surfaces on said flanges of said inner annular recess of said body, said valve member having a portion extending within said outer annular recess of said body, a removable receptacle having outer lugs adapted to pass through said spaces between and engage said integral cam surfaces on said flanges of said outer annular recess of said body, said removable receptacle being further provided with inside lugs adapted to engage said portion of said valve member extending within said outer recess of said body, a strainer member suitably mounted within said outer recess of said body, and means for maintaining a tight joint around said removable receptacle.

3. In a filter, the combination of a body having an inlet and outlet passage together with an annular recess surrounding said inlet and outlet passages, a valve member for opening and closing said inlet passage of said body, said valve member having a horizontal portion lying within said annular recess of said body, a strainer member suitably mounted within said annular recess of said body, a removable receptacle adapted to be revolved to a locked position within said annular recess of said body, said removable receptacle engaging said horizontal portion of said valve member, said valve member being thereby longitudinally moved in an opposite direction to the longitudinal movement of said removable receptacle when revolved, and means for maintaining a tight joint around said removable receptacle.

4. In a filter, the combination of a supporting body having inlet and outlet passages, said supporting body being provided with concentric annular recesses, each of said concentric annular recesses being provided with a plurality of flanges having a cam surface on its inner side, a strainer member suitably mounted in said supporting body, a removable receptacle having portions adapted to pass between and engage said cam surfaces on said flanges of the outer of said concentric annular recesses, a member having portions adapted to pass between and engage said cam surfaces on said flanges of the inner of said concentric annular recesses, said member having a portion extending within said removable receptacle, said member being engaged and operated, by said removable receptacle, to open and close the inlet passage of said supporting body.

5. In a filter, the combination of a body having inlet and outlet passages, said body being provided with an annular chamber having an open end, said body being further provided with a plurality of cam surfaces adjacent its open end, each of said cam surfaces having a lock retaining surface connected to the wall of said annular chamber, a strainer member, a removable receptacle having portions adapted to pass between and, when rotated, to engage said lock retaining surfaces of said cam surfaces, and means for maintaining a tight joint around said removable receptacle.

6. In a filter, the combination of a body having inlet and outlet passages, a strainer member in said body, a receptacle rotatably mounted in said body, and a member for opening and closing one of the passages of said body, said member being supported from said body, said member further engaging portions of said removable receptacle, said member being thereby moved, by the rotation of said removable receptacle, to and from said body, said member being further moved thereby longitudinally within said removable receptacle.

7. In a filter, the combination of a body having inlet and outlet passages, said body being provided with two sets of internal cam surfaces, one of said sets of internal cam surfaces being located within the other of said sets, each of said sets of cam surfaces being oppositely disposed to the other of said sets, a strainer member in said body, a removable receptacle having portions engaging the outer of said sets of cam surfaces of said body, a valve disposed within and engaging said removable receptacle, said valve further engaging the inner of said sets of cam surfaces of said body, and means for maintaining a tight joint around said removable receptacle.

8. In a filter, the combination of a member having a passage, a strainer member, a valve, and a removable sediment receptacle adapted to be rotatably moved in and out of said member, said removable sediment receptacle engaging and causing said valve to open and close said passage in said body, said valve moving simultaneously with and in an opposite longitudinal direction from said removable sediment receptacle.

9. In a filter comprising a strainer body together with a removable receptacle and a strainer member, a valve located within said removable receptacle, said valve being made of relatively thin material having portions of itself offset to engage portions of said strainer body, said valve being rotatably and longitudinally moved by the entrance and removal of said receptacle from said strainer body.

10. In a filter comprising a strainer body together with a removable receptacle and a strainer member, the combination of a member located within said removable receptacle, said member being made of relatively thin material having portions of itself offset to engage portions of said strainer body, and a gasket retained on said member, said member and said gasket being rotatably and longitudinally moved by the entrance and removal of said receptacle from said strainer body.

11. In a filtering device comprising a body and a rotatable strainer receptacle attached thereto together with a strainer member, a valve located within said rotatable strainer receptacle, said valve having a plurality of upwardly extending fingers for engaging said body, said valve further engaging said strainer receptacle, said valve being thereby operated to and from said body upon rotation of said strainer receptacle.

12. In a filtering device, the combination of a body having inlet and outlet passages, a strainer member, a member adjacent one of the passages of said body, means for causing said member to close one of the passages of said body, said member being moved toward said body, a removable receptacle enclosing said member and said means, and means for maintaining a tight joint around said removable receptacle.

13. In a filtering device, the combination of body having inlet and outlet passages, said body being provided with a pair of concentric cam sets, a removable receptacle having portions adapted to rotatably engage the outer of said pair of concentric cam sets, said removable receptacle being thereby moved longitudinally, a valve located within and engaging said removable receptacle and having portions adapted to rotatably engage the inner of said concentric cam sets, said valve being thereby moved longitudinally in an opposite direction to that of said removable receptacle, a filtering member suitably mounted over one of the passages of said body, and means for maintaining a tight joint around said removable receptacle.

14. In a filtering device comprising a body with inlet and outlet passages, a strainer member, a receptacle adapted to be entered and rotatably operated inwardly in said body and a valve engaging said body and said receptacle, said valve being adapted to be rotatably operated outwardly during the inward movement of said receptacle.

15. In a filtering device, the combination of a supporting member having inlet and outlet passages, a strainer member, a receptacle capable of being rotatably entered in and rotatably removed from said supporting member, and a valve within said receptacle for opening and closing the inlet passage of said body, said valve being rotatably operated by the rotation of said receptacle, said valve being thereby caused to move longitudinally relative to said bowl.

16. In a filter comprising a body having a passage therein, the combination of a removable receptacle having an open end, a strainer member, a member within said removable receptacle, said member having a portion for engaging said removable receptacle, said member being supported from the body of the filter, and means for closing the passage in said body, said means being actuated by said member.

17. In a filter, the combination of a body having a passage therein, a strainer member, a member for opening and closing the passage in said body, a member supporting said member for opening and closing the passage in said body, and a removable receptacle having a portion for engaging said movably mounted member, said removable receptacle being removably mounted around said movably mounted member.

18. In a filter, the combination of a supporting body having a passage therein, a strainer member, a removable receptacle rotatably mounted in said supporting body, and a member for opening and closing the passage in said supporting body, said member being caused to move rotatably with and longitudinally relative to said removable receptacle when said removable receptacle is rotated in said supporting body.

19. In a filter, the combination of a body, a strainer member, a removable receptacle attached to said body, and a rotatable valve member supported within said removable receptacle, said rotatable valve member having portions for engaging shoulders on the side walls of said removable receptacle, said rotatable valve member being operated by the removal of said removable receptacle.

20. In a filter, the combination of a body, a removable receptacle attached thereto, a strainer member, and a rotatable valve member supported on said rotatable body, said valve member extending transversely within said removable receptacle, said rotatable valve member being operated by the attaching or detaching of said removable receptacle.

21. In a filter, the combination of a body having a plurality of passages therein, said body being provided with an annular chamber having an open end, said body being provided with one or more cam surfaces connected to the wall of the annular chamber of said body, said body being further provided with a plurality of retaining surfaces connected to the wall of the annular chamber of said body, a strainer member, a removable receptacle having portions adapted to engage the cam and retaining surfaces of said body, and means for maintaining a tight joint around said removable receptacle.

22. In a filter, the combination of a body having an annular chamber with an open end, said body being provided with unyielding cam surfaces connected to the wall of the annular chamber of said body, a strainer member, a removable receptacle adapted to be entered longitudinally in the annular chamber of said body, said removable receptacle being further adapted to revolvably engage the unyielding cam surfaces connected to the annular wall of said body, and means for preventing said removable receptacle from being operated beyond the unyielding cam surfaces engaged by said removable receptacle.

GEORGE B. INGERSOLL.